W. W. SHANOR.
UNLOADING APPARATUS.
APPLICATION FILED AUG. 2, 1915.
1,222,686.
Patented Apr. 17, 1917.
3 SHEETS—SHEET 1.
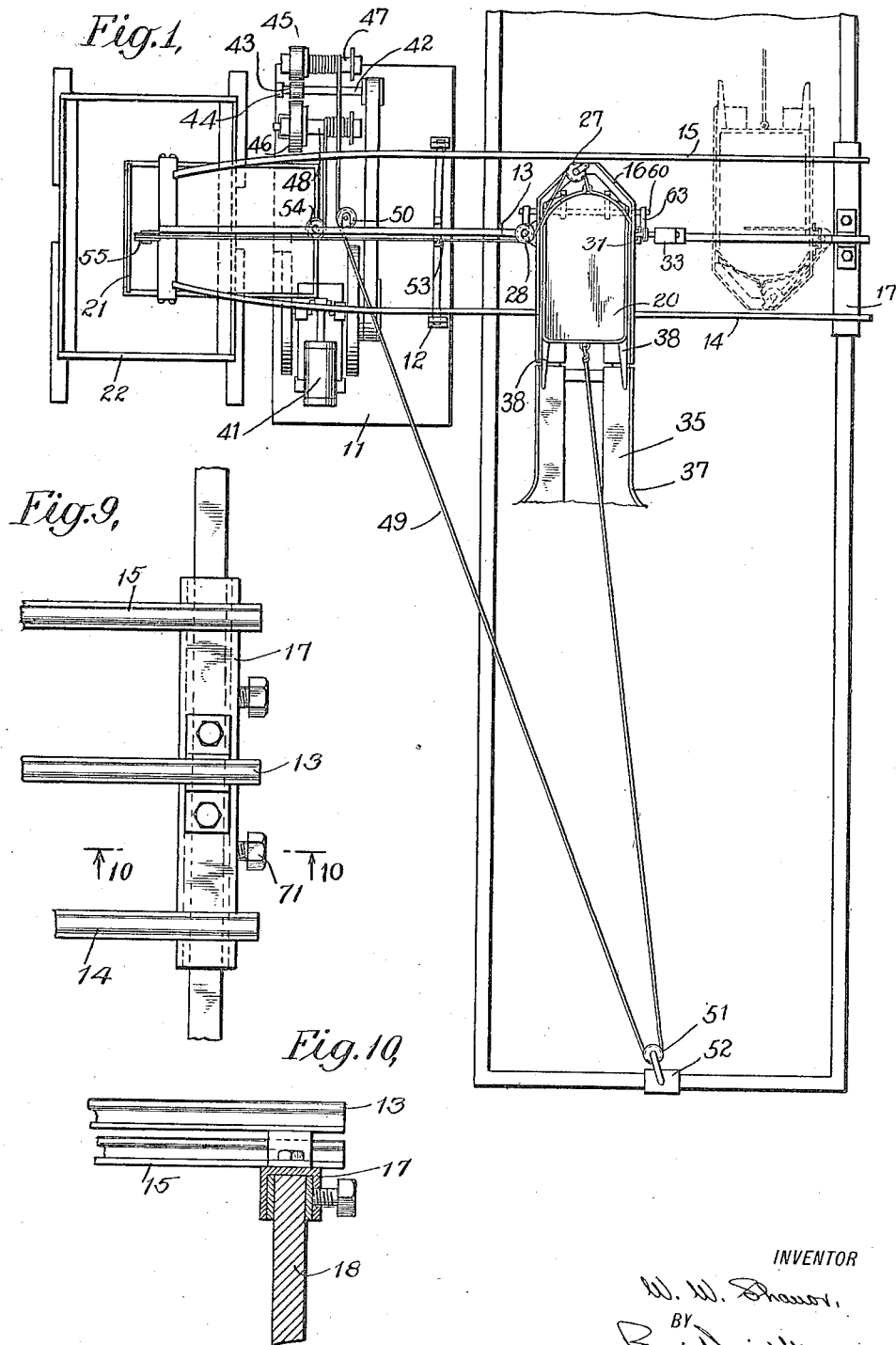

W. W. SHANOR.
UNLOADING APPARATUS.
APPLICATION FILED AUG. 2, 1915.
1,222,686.
Patented Apr. 17, 1917.
3 SHEETS—SHEET 2.
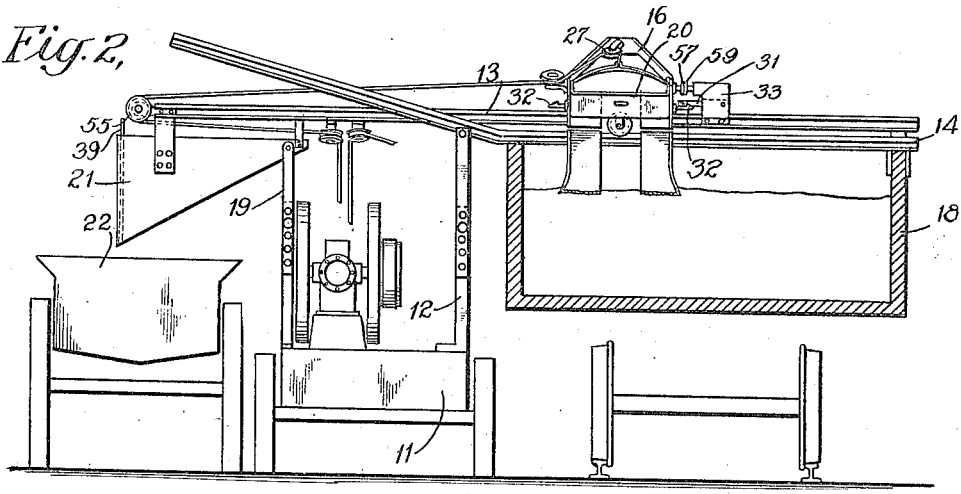
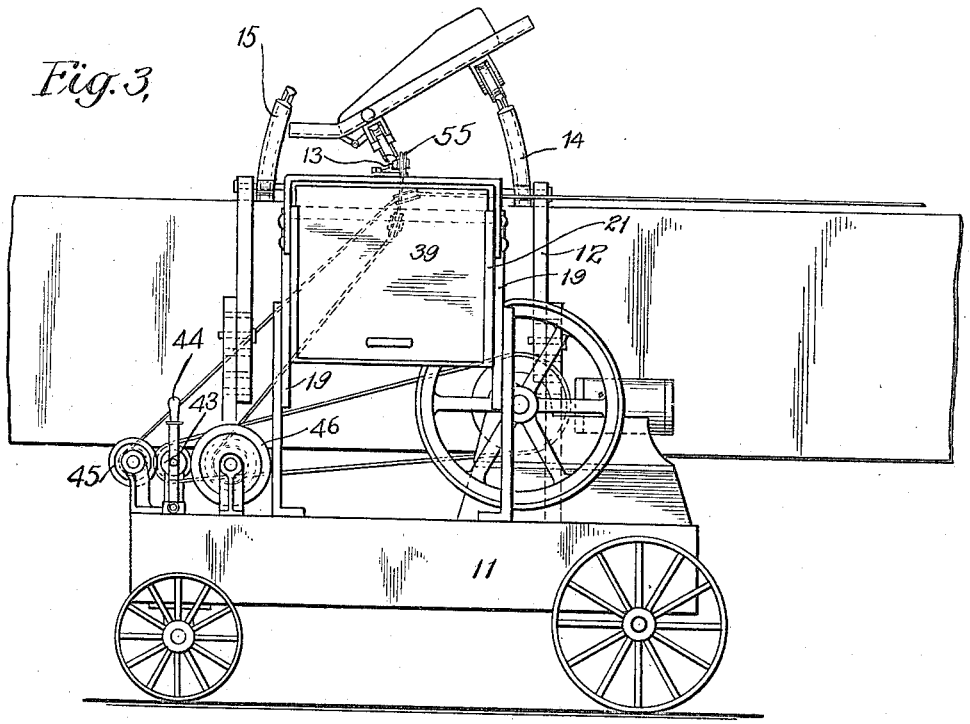
INVENTOR
W. W. Shanor,
BY
ATTORNEYS

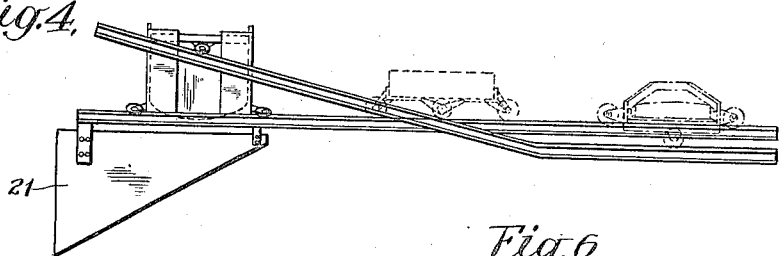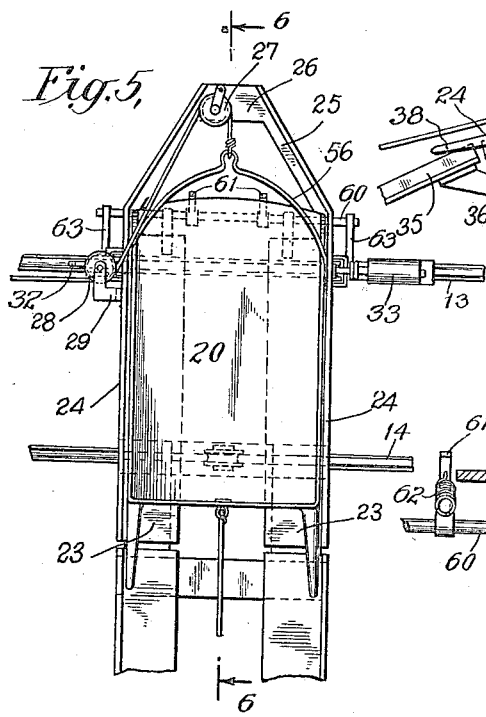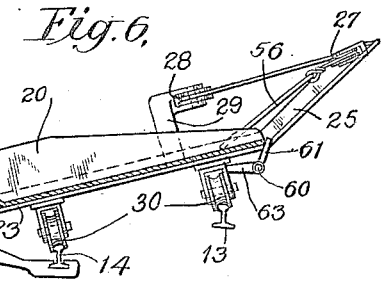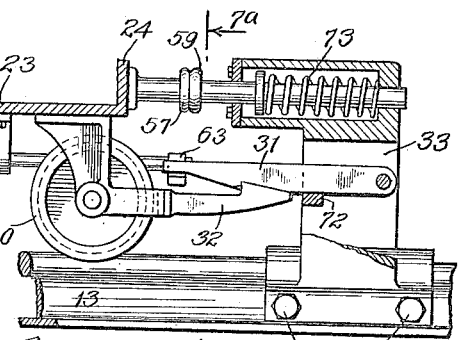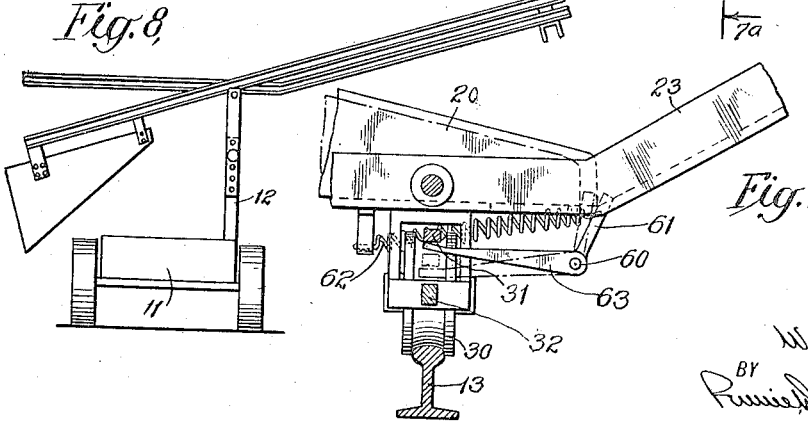

UNITED STATES PATENT OFFICE.

WILLIAM WILSON SHANOR, OF BETHLEHEM, PENNSYLVANIA.

UNLOADING APPARATUS.

1,222,686. Specification of Letters Patent. Patented Apr. 17, 1917.

Application filed August 2, 1915. Serial No. 43,308.

*To all whom it may concern:*

Be it known that I, WILLIAM W. SHANOR, a citizen of the United States, residing at Bethlehem, Northampton county, Pennsylvania, have invented certain new and useful Improvements in Unloading Apparatus; and I do hereby declare the following to be a full, clear, and exact description of the invention, such as will enable others skilled in the art to which it appertains to make and use the same.

This invention is directed to the provision of an improved form of unloading apparatus adapted particularly for use in unloading crushed stone, gravel, sand, coal or the like from railway cars and discharging it into wagons or other suitable receptacles.

The work of unloading railway cars is now performed, to a very large extent, by manual labor and is both time consuming and expensive. The present invention aims to provide means for reducing the time consumed and the expense involved in unloading railway cars, and to this end contemplates the provision of apparatus which may be mounted in coöperative relation to a car and operated so as to unload the car. Preferably, the apparatus is made readily portable by mounting it upon a suitable wheeled vehicle so that it may be easily moved around in a freight yard from one car to another. The apparatus involves the provision of a track mounted in an elevated position upon the supporting vehicle with its ends extending laterally therefrom so that when the vehicle is run alongside a car, one end of the track extends over the body of the car and the other end extends to the other side of the supporting vehicle, so that the material unloaded may be readily discharged into wagons or other receptacles. A truck is adapted to move back and forth on this elevated track to a receiving position over the car and to a dumping position where the material is discharged. This truck is adapted to receive a scoop which is moved into the car body and filled, and then moved upon the truck, after which the truck with the scoop thereon is moved laterally along the track to the discharge position. To facilitate these various operations, the rails of the track are so laid as to vary the inclination of the truck traveling thereon; when the truck is over the car body, this inclination is such as to permit the scoop to be readily moved from the truck into the car, and, when loaded, from the car into the truck; also, when the truck with the loaded scoop thereon is moved to the dumping position, the truck is so inclined as to cause the passage of the material from the scoop. In combination with the parts so constructed, power actuated devices are employed whereby the loaded scoop may be drawn by power from the loading position in the car into the truck and then the truck moved upon the rails. When the load of the scoop has been discharged, the truck with the scoop thereon may be moved by gravity or otherwise along the rails to the opposite end of the track and the power actuated devices employed for moving the scoop from the truck to the loading position within the car body.

I have illustrated the preferred embodiment of the invention in the accompanying drawings, in which Figure 1 is a plan view of the unloading apparatus mounted in coöperative relation to the car; Fig. 2 is an end view of the apparatus shown in Fig. 1; Fig. 3 is a view of the unloading apparatus in elevation showing the truck and the scoop thereon in dumping position; Fig. 4 is a diagrammatic view illustrating various positions assumed by the scoop-carrying truck at different points in its range of travel; Fig. 5 is a plan view of the truck and the scoop thereon on a larger scale; Fig. 6 is a sectional view on line 6—6 of Fig. 5; Fig. 7 is a detail view of the latching mechanism for the truck; Fig. 7$^a$ is a detail sectional view on the line 7$^a$—7$^a$ of Fig. 7, the scoop being shown in position to unlatch the truck; Fig. 8 is a diagrammatic view showing the position of the track when not in use; Fig. 9 is a plan view of one end of the track showing the means for clamping the end of the track to the side of the car body; and Fig. 10 is a detail view in section on line 10—10 of Fig. 9.

Referring to these drawings, the unloading apparatus is mounted upon a support provided with wheels so that the entire apparatus may be readily moved around from one car to another. This support for the apparatus is shown at 11 and consists of a suitable platform mounted upon wheels. Extending upwardly from the platform is a pair of standards 12 which support the elevated track; these standards are made adjustable as to their length, as is shown in the drawings, so that the apparatus may be adapted for use in unloading cars of different heights. The track is pivotally mounted upon the upper ends of these standards 12 and may be turned about a horizontal axis to the operative position in which it is shown in Fig. 2 or to the inoperative position in which it is shown in Fig. 8. Capacity for movement of the track to the inoperative position is specially desirable so that when the unloading apparatus is being moved, there will be no danger of the outwardly extending portion of the track coming in contact with the brake-actuating devices of the cars.

The track consists of a central rail 13 and two outer rails 14 and 15 on opposite sides thereof. These rails support a truck 16 which is adapted to travel back and forth upon the central rail 13 and one or the other of the two outer rails 14 and 15. The truck 16 may be moved upon the track to a loading position at one end of the track and over a car 18 and to an unloading position at the other end of the track and is adapted to carry a scoop which is filled while in the car and then moved upon the truck by which it is carried to the dumping position. The support 11 for the unloading apparatus is drawn alongside a railway car while the track is in the position shown in Fig. 8 and the track is then turned upon its pivotal connection to the supports 12 to the Fig. 2 position with the rails 14 and 15 bearing upon the sides of the car body 18. In order to hold the track rigidly in position, clamping devices are preferably provided whereby the rails may be locked to the car. For this purpose the outer ends of the rails 13, 14 and 15 are secured to a clamping bracket 17, which bracket is adapted to fit over the side of the car 18. The bracket 17 is provided with threaded bolts 71 which may be turned up to cause their ends to grip the wall of the car.

When the track has been turned on its pivotal support to the operative position shown in Fig. 2, the end thereof opposite from that overlying the car is supported by means of braces 19 rising from the platform 11, each of which braces, like the standards 12, is constructed so as to permit of adjusting its length.

The central rail 13 of the track is straight throughout its length and, when the apparatus is in the operative position, this rail is horizontal. The portions of the rails 14 and 15 which are adapted to overlie the car body 18 are also straight and horizontally disposed when the track is in its operative position, but these portions of the rails 14 and 15 are mounted in a lower horizontal plane than the central rail 13. The remaining portions of the rails 14 and 15 are inclined upwardly so that their ends distant from the car 18 are a substantial distance above the central rail 13, as is shown in Fig. 2. This construction of the three rails is such that as the truck 16 is moved along the rails, its inclination is varied. When the truck overlies the car body 18, it will be inclined with its receiving end downward because at this point the portion of the outer rail is below the level of the central rail. This position of the truck is shown at the right of Fig. 4. When the truck is moved toward the discharge position, its inclination is changed by the rise in the outer rail so that the truck is brought to a horizontal position as shown at the center of Fig. 4, and then is inclined in a direction opposite to that assumed initially so that the discharge end of the truck is downward. This position of the truck is illustrated at the left of Fig. 4.

The truck 16 consists of two substantially parallel ways 23 having vertical walls 24 at their outer edges. At the forward end of the truck, the side walls are inclined upwardly and converge as shown at 25, and the ends of these walls are connected by a cross bar 26. The truck is provided with wheels 30 adapted to run upon the central rail 13 and one or the other of the outer rails 14 and 15. This truck is adapted to receive a scoop 20 which slides upon the ways 23. At its rear end, the scoop is provided with handles 38 by which it may be guided and at the forward end of the scoop is a bail 56. The scoop is moved in the forward direction by a cable 53 which is connected to the bail 56 and passes over a pulley 27 mounted upon the cross bar 26 at the forward end of the truck. The cable then passes over a second pulley 28 carried by a bracket 29 which is secured to one side 24 of the truck above the level of the central rail 13.

A single means is provided for employing power actuated devices to draw the scoop from the car body into the truck and for moving the truck along the track. To permit this, a latch 31 is provided which is adapted to hold the truck against movement on the track while the scoop is being drawn into the truck and which is caused to automatically release the truck when the scoop has been drawn into it so that the truck with the scoop thereon may be moved along the track. This latch is pivotally mounted upon a support 33 which may be secured in any selected position to the central rail 13 in any suitable manner as for example by means of bolts 34 adapted to engage the web of the rail. The latch 31 is adapted to engage a coacting latching member 32 upon the truck 23; as shown, there is a latching member 32 on each side of the truck so that the latch 31 is operative when the truck is mounted in either of the two positions in which it is shown in Fig. 1.

Mounted upon the truck beneath the forward end thereof is a transverse rock shaft 60 carrying upwardly extending arms 61 which are normally held in engagement with the front ends of the ways 23 by means of springs 62. These arms project slightly above the ways whereby as the scoop is drawn upon the truck its front edge will engage the arms and cause the shaft 60 to rock. At its end, the rock shaft carries a latch actuating member 63, which when the rock shaft is in its normal position will be beneath and out of engagement with the latch 31, as shown in Fig. 7. When however, the shaft is rocked by the scoop as above described, as shown in full lines in Fig. 7$^a$, the member 63 will engage the latch and raise it out of engagement with the latching member 32 upon the truck. The truck may then be moved laterally along the track. When the truck has been moved away from the latch, the latter is supported by means of the projection 72 on the standard 33. When the scoop has been emptied and as the truck moves back over the car, the springs 62 cause the arms 61 to push the scoop backward upon the truck, thus permitting the arms and the rock shaft 60 to return to their normal positions, as shown in dotted lines in Fig. 7$^a$. When the rock shaft is in this position, the latch actuating member 63 is inoperative and the latch 31 automatically engages the locking member 32 as the truck reaches its initial position to lock it against movement. When the truck moves back along the track to the position over the car body, its movement is arrested by a buffer 59 mounted upon the standard 33 and held yieldingly in position by a spring 73. This buffer 59 coacts with one or the other of two buffers 57 mounted upon the truck 23. The standard 33 may be secured to the rail 13 in any desired position so that the buffer 59 will serve to arrest the backward movement of the truck at the point found to be most advantageous for unloading the car and the backward movement of the truck is followed automatically by the latching of the truck against movement by the latch 31.

In order to guide the scoop into the truck, an inclined runway 35 is provided which may be detachably secured to one or the other of the rails 14 or 15 of the track by means of brackets 36, with its upper end registering with the ends of the ways 23 at the open end of the truck. The runway is provided with side walls 37 adapted to register with the side walls 24 of the truck and having their lower ends flared outwardly to facilitate the entrance of the scoop into the guideway.

The desired movements of the scoop and truck are effective by power driven devices mounted upon the support 11. These devices include an engine 41 of any suitable type connected by a belt or otherwise to a shaft 42 carrying a friction wheel 43. This shaft is so mounted as to permit it to be moved laterally by a handle 44 so that the friction wheel 43 may be carried into mesh with either one of the friction wheels 45 and 46 which are secured to winding drums 47 and 48 respectively. In the intermediate position of the shaft 42, the friction wheel 43 is disengaged from both of the two coacting friction wheels. The scoop is withdrawn from the truck and into the car by means of a rope 49, one end of which is secured to the drum 47. This rope passes around a guide sheave 50 to and around a pulley 51 carried by a bracket 52 adapted to be detachably secured to the end wall of the car and the other end of this rope is connected to the scoop 20. The forward movement of the scoop and the movement of the truck with the scoop thereon to the dumping position is effected by a rope 53 having one end secured to the winding drum 48. This rope passes around a guide sheave 54 to and around a second sheave 55 which is mounted upon the end of the central rail 13, as shown in Fig. 1. From the sheave 55, this rope passes around the pulleys 28 and 27 carried by the truck and has its end connected to the scoop as heretofore described.

A hopper 21 is secured to the track at the dumping end thereof to receive the material discharged from the scoop through the opening in the bottom of the truck under the forward end of the scoop. The hopper is provided with a sliding door 39 which is opened when it is desired to discharge the material therefrom into a wagon 22 or other suitable receptacle positioned at the side of the platform 11 to receive the unloaded material.

The operation of the apparatus is as follows: Assuming the parts of the unloader to be in the positions shown in Figs. 1 and 2, the handle 44 is rocked to cause the friction wheel 43 to mesh with the friction wheel 45 and to rotate the drum 47. As the rope 49 is wound upon the drum, it will draw the scoop from the truck down the runway into the car. During this movement of the scoop, the drum 48 is permitted to rotate freely in order to allow the rope 53 to unwind therefrom. When the scoop has been drawn to the desired point within the car, the friction wheel 43 is returned to its intermediate position. The handle 44 is then rocked in the opposite direction to cause the friction wheel 43 to mesh with the friction wheel 46. The drum 48 is thus rotated to wind up the rope 53 and pulls the scoop to and up the runway and into the truck, the scoop being directed to cut into the material and being guided to enter the lower end of the runway by means of the handles 38. As the scoop is drawn into the truck its front edge engages the arms 61 thereby rocking the shaft 60 and causing the actuating member 63 to lift the latch 31 out of engagement with the latching member 32, whereupon the further winding up of the rope 53 upon the drum 48 causes the truck to travel along the track toward the inner end thereof. During the travel of the truck, wheel 30 which engages the rail 14 rides up the inclined portion of the rail as above described and as indicated diagrammatically in Fig. 4. When the truck reaches the opposite end of the track, it is tilted into its dumping position, as shown in Fig. 3, and the material is discharged from the scoop into the hopper 21 from which it may be discharged into the wagon 22 by opening the door 39.

When the material has been discharged from the scoop, the truck is permitted to coast back along the track into its normal position, in which position it is brought to rest by means of one of the two bumpers 57 on the truck and the bumper 59 mounted on the support 33. As the truck approaches its position of rest, the latch 31 will automatically engage the locking member 32 as above described to lock the truck against movement. The operation of filling and emptying the scoop is repeated in this manner until the desired amount of the material has been removed from the car.

If it be desired to remove material from the other end of the car, this may be accomplished without moving the platform to the other side of the car. For this purpose, the truck is removed from the rails 13 and 14, and is turned around and placed upon the rails 13 and 15, as indicated in dotted lines in Fig. 1. Also, the runway 35 is detached from the rail 14 and is attached to the rail 15 and the bracket 52 carrying the pulley 51 is attached to the other end wall of the car. Also, the end of the rope 53 is detached from the bail 56, and is again attached thereto after being carried across the truck and around the pulleys 28 and 27, as shown in dotted lines. It will be necessary to change the relative positions of the platform and car sufficiently to permit the removal of the material which was underneath the track when in its first position. As both sides of the truck are provided with a latch engaging lug 32 and a bumper 57, the latch 31 will be moved into and out of its latching position in the manner above described, it being understood that the rock shaft 60 carries a latch actuating member 63 at each end thereof so that either one may engage and lift the latch 31.

After the unloading operation has been completed, the car clamping device 17 is released, and the track is rotated about its pivotal connection to the standards 12 into the position indicated in Fig. 8, in which position the outer end thereof is raised to clear the brake-actuating devices of the cars. The empty car may then be replaced by a loaded car, or the unloader may be moved alongside another car at some other place. In either case, when the unloader and the car to be unloaded occupy their proper relative positions, the outer end of the track is moved downwardly and clamped to the side of the car, after which the material is removed from the car as above set forth.

Having described my invention, what I claim is:

1. In an unloading apparatus, the combination of a support, a track mounted thereon in an elevated position and extending therefrom so that its end may overlie a car to be unloaded, a truck adapted to move back and forth upon the track, a scoop, and means for moving the scoop into and out of the truck and for moving the truck upon the track; substantially as described.

2. In an unloading apparatus, the combination of a support, a track mounted thereon in an elevated position and extending therefrom so that its end may overlie a car to be unloaded, a truck movable on the track, a scoop adapted to be supported on the truck, and means for moving the truck upon the track, said rails being inclined relatively so that throughout a portion of the track they lie in different horizontal planes; substantially as described.

3. In an unloading apparatus, the combination of a portable support, a substantially horizontal rigid track mounted intermediate its ends upon the support in an elevated position so that the portion of the track projecting to one side of the support may overlie a car to be unloaded, a wheeled truck movable on the track, a scoop, and a single means for drawing the scoop upon the truck and moving the truck upon the track from a position at one end of the track overlying the car to be unloaded over the support to a dumping position at the side of the support opposite that of the car to be unloaded; substantially as described.

4. In an unloading apparatus, the combination of a portable support, a substantially horizontal rigid track mounted intermediate its ends upon the support in an elevated position so that the portion of the track projecting to one side of the support may overlie a car to be unloaded, a wheeled truck movable on the track, a scoop, a latch for the truck operated by the scoop when the latter moves upon the truck, and a single means for drawing the scoop upon the truck and moving the truck upon the track from a position at one end of the track overlying the car to be unloaded over the support to a dumping position at the side of the support opposite that of the car to be unloaded; substantially as described.

5. In an unloading apparatus, the combination of a wheeled vehicle constituting a support, a track extending crosswise of the support and beyond opposite sides thereof and pivotally mounted upon the support in an elevated position so that it may be turned about a horizontal axis to operative and inoperative positions, a truck on the track movable thereon to loading and dumping positions at opposite sides of the support, a latch for holding the truck against movement upon the track when the truck is in the loading position, a scoop, an operating device, a connection from the operating device to the scoop through which the scoop is drawn upon the truck and the truck moved upon the track, and means on the scoop for operating the latch when the scoop is moved upon the truck; substantially as described.

6. In an unloading apparatus, the combination of a support, a track mounted thereon in an elevated position and extending therefrom so that its end may overlie a car to be unloaded, a carrier movable upon the track to filling and discharge positions, and a hopper at the discharge end of the track to receive the material discharged from the carrier, said rails being inclined relatively so that throughout a portion of the track they lie in different horizontal planes; substantially as described.

7. In an unloading apparatus, the combination of a support, a track mounted thereon in an elevated position and extending therefrom so that its end may overlie a car to be unloaded, said track consisting of a central rail and two outer rails, a truck movable back and forth upon the central rail and one or the other of the two outer rails, and a scoop movable into and out of the truck; substantially as described.

8. A portable unloading apparatus comprising a support provided with wheels, a track mounted on the support in an elevated position with one end extending from the support so as to overlie a car to be unloaded, clamping devices on the outer end of the track for gripping the side wall of a car, a carrier for the material adapted to move back and forth upon the track to loading and discharge positions and means for discharging the carrier; substantially as described.

9. In an unloading apparatus, the combination of a support, a track mounted thereon in an elevated position and extending therefrom so that its end may overlie a car to be unloaded, a truck movable upon the track, a scoop, a cable attached to one end of the scoop and passing over a sheave on the truck, a cable attached to the other end of the scoop and passing over a sheave affixed to the car body, and winding devices to which said cables are connected; substantially as described.

10. In an unloading apparatus, the combination of a support, a rigid track mounted thereon in an elevated position and extending crosswise of the support beyond the sides of the support so that one of its ends may overlie a car to be unloaded, a wheeled truck movable upon the track to a loading position at one side of the support and to a discharge position at the other side of the support, one of the rails of the track being inclined relatively to the other rail, and means for causing the truck to move upon the track, substantially as described.

11. In an unloading apparatus, the combination of a support, a rigid track mounted thereon in an elevated position and extending laterally therefrom so that its end may overlie a car to be unloaded, said track being of uniform gage throughout its length and having one of the rails curved upwardly and inwardly relative to the other rail, a wheeled truck adapted to travel upon the track, and a scoop adapted to be received upon the truck, substantially as described.

12. In an unloading apparatus, the combination of a support, a track mounted thereon in an elevated position and extending laterally therefrom so that its end may overlie a car to be unloaded, said track having one of its rails inclined relatively to the other rail, a wheeled truck movable upon the track, a scoop and a single means for moving the scoop upon the truck and for moving the truck upon the track, substantially as described.

13. In an unloading apparatus, the combination of a support, a substantially horizontal rigid track mounted intermediate its ends upon the support in an elevated position so that the portion of the track projecting to one side of the support may overlie a car to be unloaded, one of the rails of the track being inclined relatively to the other rail so as to vary the inclination of a truck moved upon the track to effect the dumping of a load, a truck on the track, means for moving the truck to loading and dumping positions at opposite sides of the support, a latch for holding the truck against movement upon the track when the truck is in the loading position, a scoop, an operating device, a connection from the operating device to the scoop through which the scoop is drawn upon the truck and the truck is moved upon the track, and means on the scoop for operating the latch when the scoop is moved upon the truck; substantially as described.

14. In an unloading apparatus, the combination of a portable support, a substantially horizontal rigid track pivotally mounted intermediate its ends upon the support in an elevated position so that the portion of the track projecting to one side of the support may overlie a car to be unloaded, a clamping device mounted on said projecting portion of the track for clamping the track to one side of the car to be unloaded, a truck movable upon the track, and means for moving the truck to loading and dumping positions at opposite sides of the support; substantially as described.

15. In an unloading apparatus, a support, a substantially horizontal rigid track mounted intermediate its ends upon the support in an elevated position so that the portion of the track projecting to one side of the support may overlie a car to be unloaded, a truck on the track, means for moving the truck upon the track to loading and dumping positions at opposite sides of the support, a latch for holding the truck against movement upon the track when the truck is in the loading position, a scoop, an operating device, a connection from the operating device to the scoop through which the scoop is drawn upon the truck and the truck is moved upon the track, and means on the scoop for operating the latch when the scoop is moved upon the truck; substantially as described.

16. In an unloading apparatus, a support, a substantially horizontal rigid track mounted intermediate its ends upon the support in an elevated position so that the portion of the track projecting to one side of the support may overlie a car to be unloaded, a truck on the track movable thereon to loading and dumping positions at opposite sides of the support, a latch for holding the truck in the loading position, a pulley upon the truck, a scoop, a cable passing over said pulley and secured to the scoop, means for winding up on said cable to draw the scoop upon the truck, and to move the truck upon the track, and means on the scoop in position to operate said latch when the scoop is moved upon the truck; substantially as described.

17. In an unloading apparatus, a support, a substantially horizontal rigid track mounted intermediate its ends upon the support in an elevated position so that the portion of the track projecting to one side of the support may overlie a car to be unloaded, a truck on the track movable to loading and dumping positions, a latch for holding the truck against movement upon the track when the truck is in the dumping position, a pulley upon the truck, a scoop, a guideway for guiding the scoop from the car to be unloaded upon the truck, and means for winding up upon the cable to draw the scoop from the car upon the truck, and to move the truck upon the track, and means on the scoop in position to operate said latch when the scoop is moved upon the truck; substantially as described.

18. In an unloading apparatus, the combination of a support, a track mounted thereon, a truck adapted to travel along the track, a runway adapted to be positioned within the car to be unloaded, means for detachably securing the runway to the track with its upper end registering with the truck, a scoop, and means for drawing the scoop over the runway and upon the truck; substantially as described.

19. In an unloading apparatus, the combination of a support, a track mounted thereon, a truck adapted to travel along the track, means for holding the truck against movement, a scoop movable upon the track and coöperating with said holding means to automatically release the truck, and means for drawing the scoop upon the truck and for moving the truck upon the track after the scoop has effected the release of the truck; substantially as described.

In testimony whereof I affix my signature, in presence of two witnesses.

WILLIAM WILSON SHANOR.

Witnesses:
P. G. SHANOR,
M. E. SPEIRS.

Copies of this patent may be obtained for five cents each, by addressing the "Commissioner of Patents, Washington, D. C."